March 29, 1949.  F. D. PRAGER ET AL  2,465,980
LIQUID TREATMENT Filed Aug. 4, 1944  4 Sheets-Sheet 1

INVENTORS.
Frank D. Prager,
Roy Welter,
BY Frank D. Prager
atty.

March 29, 1949. F. D. PRAGER ET AL 2,465,980
LIQUID TREATMENT
Filed Aug. 4, 1944 4 Sheets-Sheet 2

INVENTORS.
Frank D. Prager,
BY Roy Welter,
Frank D Prager
atty.

March 29, 1949.  F. D. PRAGER ET AL  2,465,980
LIQUID TREATMENT
Filed Aug. 4, 1944  4 Sheets-Sheet 4

INVENTORS.
Frank D. Prager,
Roy Welter,
BY Frank D. Prager
atty

Patented Mar. 29, 1949

2,465,980

UNITED STATES PATENT OFFICE 2,465,980

LIQUID TREATMENT

Frank D. Prager, Chicago, Ill., and Roy Welter, East Chicago, Ind., assignors to Graver Tank & Mfg. Co., Inc., a corporation of Delaware Application August 4, 1944, Serial No. 548,072

11 Claims. (Cl. 210—16)

This invention relates to liquid treatment, and particularly to the precipitation of solids from liquid, with sludge recirculation and sludge filtration.

It is a primary object of this invention to provide apparatus for such treatment, which utilizes the space available to the greatest possible extent.

Another object is to provide apparatus for such treatment, which can be covered and enclosed with the least possible expense.

Another object is to provide apparatus for such treatment, wherein the expenses and complications involved in applying the necessary power for sludge recirculation are minimized.

Still another object is to provide a battery of units for such treatment, with maximum efficiency, economy, and flexibility.

Still other objects will appear from the following disclosure.

The preferred apparatus comprises a battery of clarification tanks 11, 12, 13, 14, etc. Each of these tanks is substantially square in plan view, and the complete battery is rectangular, with straight longitudinal tank walls 15 being flush with one another to form a long wall of the battery and straight transverse walls 16 being arranged to confine and separate the tanks. The whole battery, including the several longitudinal and transverse walls, is built of concrete.

Each of the tanks has a clarification zone 17 arranged therein, the area of which is approximately that of a circle inscribed within the square outline of the tank. More particularly, the lower part of each clarification zone 17 has the shape of such an inscribed circle, whereas the upper part of each clarification zone 17 has the shape of a rectangular octagon, the sides of which are tangential on said inscribed circle; the diagonal sides being formed by concrete partition walls 18. These partitions 18 extend at 45° from the longitudinal walls 15 to the transverse walls 16, and also extend from the top to the bottom of the tank, whereby outer mixing and coagulating compartments 19, of triangular shape in plan view, are separated from the inner clarification chamber 17. Each of the four corners of a tank may have such a mixing and coagulating compartment 19; however, in some instances such mixing and coagulating compartments may be provided in three, two, one, or none of the corners, and unused corners may be utilized for other purposes.

In the preferred embodiment shown, we use all four corners of each tank for mixing and coagulating purposes. As a result a total of about 20% of the complete area and volume of the square tank is available for such chambers. It should be noted that it was heretofore usual in this art to provide about 20% of the total tank area and volume for mixing and coagulating purposes, in combination tanks of this general type. We have discovered that the corners left by a regular octagon inscribed in a square, as proposed, not only provide such area and volume, but can be utilized for required mixing and coagulating, as hereinafter described.

Figure 2:
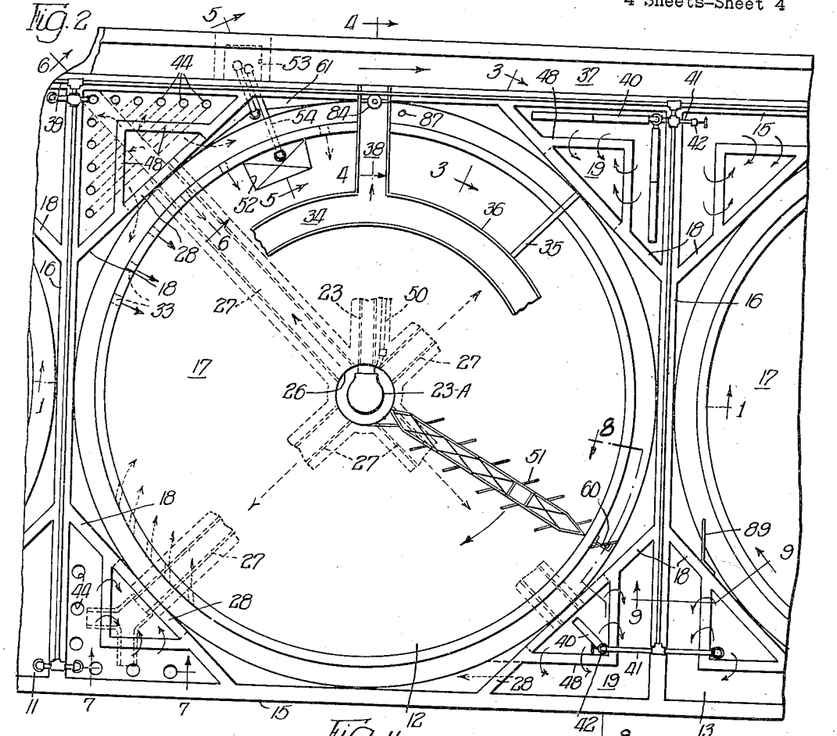
Figure 2 is a plan view of the apparatus shown in Figure 1, with certain parts removed.
Figures 3, 4:
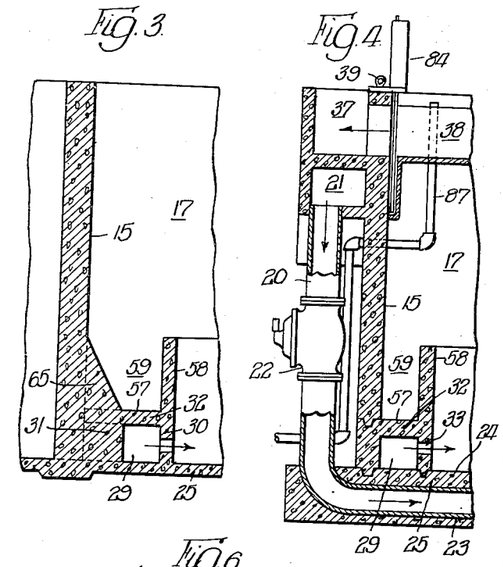
Figures 3, 4, 5, and 6 are partial, sectional views, taken respectively along the lines 3—3, 4—4, 5—5, and 6—6 in Figure 2.

The raw water to be treated enters each of the tanks through a pipe 20 branched off from an inlet header 21. This inlet header 21 extends along one of the longitudinal walls 15, as shown in Figures 2 and 4. The branch inlet pipe 20 has a rate of flow compensating and adjusting valve 22 interposed thereon, adjacent the longitudinal side wall 15, and has a final portion 23 extending below the surface 24 of the concrete tank bottom 25, which bottom may be substantially flat, as shown. In the center of this bottom, there is found a distributing sump 26, into which the branch inlet pipe discharges through a proper fitting 23—A. Distributing pipes 27 radiate from this central sump, to establish communication between the raw water inlet and the mixing and coagulating corners 19.

Figure 1:
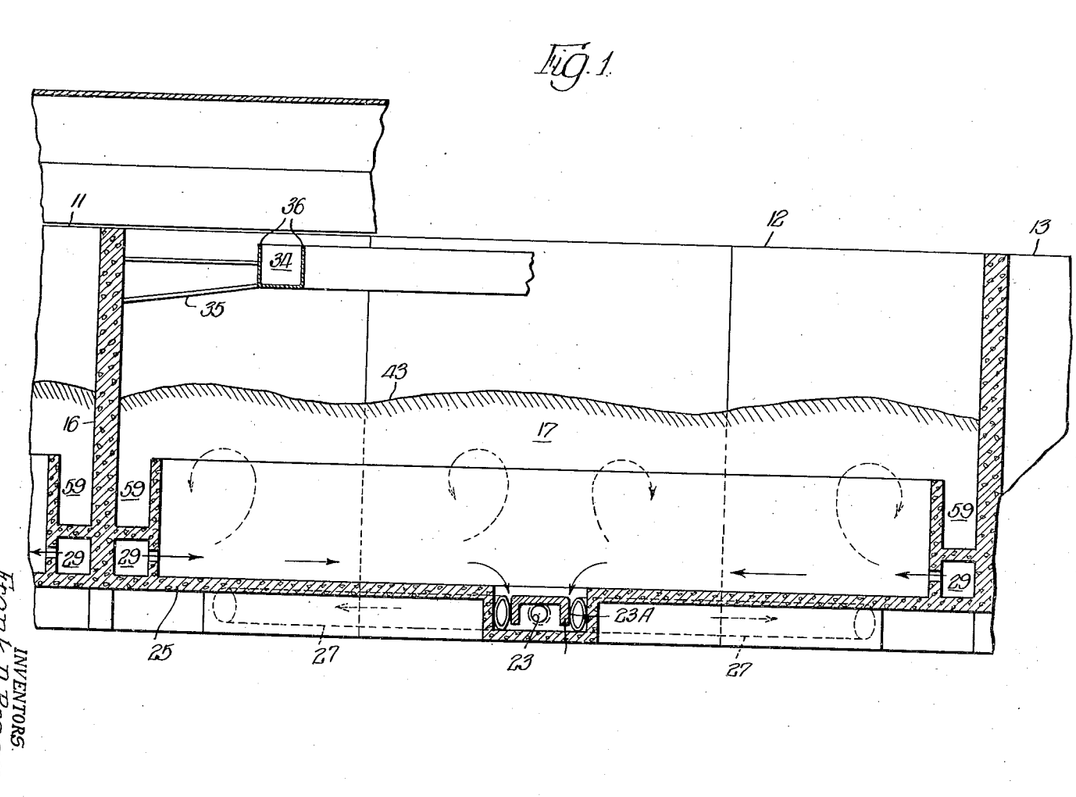
Figure 1 is a section of apparatus embodying this invention, the section being taken along lines 1—1 in Figure 2.
Figure 6:
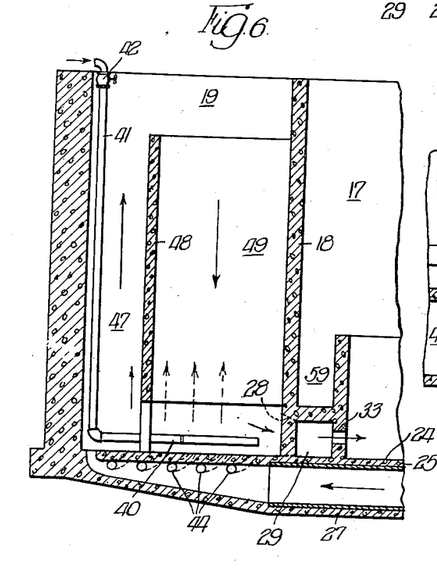

Further, these corners 19 communicate with the clarification zone 17, by means including passages 28 extending through the diagonal partition walls 18. These openings 28 communicate with the mixing and coagulating corners 19 direct. They further communicate with the clarification chamber 17 through a distributing duct 29, surrounding the clarification chamber adjacent the periphery thereof. In the preferred embodiment, the distributing duct as shown in Figures 1 and 4, the distributing duct 29 is annularly disposed in the lowest part of the clarification zone 17. It has an inner concrete wall 30 of cylindrical shape, concentric with a circle inscribed in the square tank, and having somewhat smaller diameter. The bottom of the duct 29 may be integral with the tank bottom 25. The outside wall of the duct 29 may be integral with the outside wall of the octagonal clarification zone 17; that is, with the longitudinal and transverse walls 15 or 16, as illustrated by Figure 4, and with the diagonal partition walls 18, as shown in Figure 6; a suitable corner fill 31 being provided in the obtuse corners, where the diagonal walls join the square side walls, as shown in Figure 3. The top cover of the duct 29 may be formed by an annular, horizontal wall 32, the underside of which may slope slightly toward the openings 28 in order to facilitate the escape of any air that may be entrained into the duct 29. The duct communicates with a low part of the clarification zone 17, through a plurality of discharge openings 33, passing through the inside wall 30. These openings are uniformly spaced from one another, and their total area is preferably less than the maximum area of the duct 29, in order to provide substantially uniform liquid distribution through the several discharge openings 33. The direction of discharge through these openings is radial, adjacent the corner compartment shown in the upper left-hand part of tank 12 in Figure 2; and spiral, adjacent the corner compartment shown in the lower left-hand part of the same tank.

Pursuant to sludge filtration and clarification in the chamber 17, the treated liquid is withdrawn from the upper part of said chamber, by a launder 34, which is suitably supported from the walls 15, 16 and 18 by brackets 35. The launder is preferably a ring, dividing the area of the clarification chamber 17 into substantially uniform parts, and having overflow weirs 36 on the outside and inside of the launder. This arrangement tends to induce a uniform flow of liquid through the clarification chamber and to promote efficient clarification, regardless of disturbances due to sudden shock loads, temperature, wind and the like.

The overflow launder 34 of each tank communicates with an effluent header channel 37, through a radial, connecting launder 38. The effluent header channel 37 may extend longitudinally along the side wall 15 of the tank, above the inlet header 21, as shown in Figure 4.

In order to perform their function as mixing and coagulating chambers, the corner spaces 19 must be provided with mixing and coagulating means. In a battery of units as herein contemplated, the most economical mixing and coagulating means is generally an air lift device, inasmuch as any number of such devices may be powered by a common blower plant or other source of compressed air. Accordingly, we use such a common blower plant (not shown), which discharges through an air header pipe 39, running parallel to and above a longitudinal tank wall 15. This air header pipe communicates with air distributing devices 40, installed in each of the mixing and coagulating chambers 19. The air distributors are preferably made from conventional porous tubes, although perforated tubes, porous plates and various other equivalents could be substituted. Each air distributor 40 receives compressed air from the air header 39 through a branch air pipe 41, with suitable throttling and controlling valves 42 interposed thereon, so that each mixing and coagulating chamber 19 may receive a proper amount of air. When the air is discharged from such a porous tube 40, a stream of air bubbles is discharged into the surrounding water. As a result, a mixture of air bubbles and water is formed above the air distributor. Such mixture being lighter than the water surrounding the same, will rise upwardly, creating a zone of low pressure or suction below the stream of air bubbles, and a zone of raised pressure above the air distributor and around the rising stream. We preferably install the air distributor tubes horizontally, and so as to provide considerable volume of water around the rising stream produced by the same. As a result, extreme rising velocities are avoided, and descending streams of water are formed in the water surrounding said rising streams. Considerable agitation is achieved in this manner.

In the preferred embodiment as shown, the air lift devices 40 serve the further purpose of producing a closed circulation of fluid. This circulation may be uniformly maintained, regardless of variations or temporary stoppage of the throughput flow. It serves to keep some of the sludge in suspension in the clarification zone 17, and thereby to maintain a sludge bed 43, for proper sludge filtration treatment of the throughput liquid. At the same time, the circulation also serves to return sludge from this sludge bed 43, in order that the initial chemical treatment may take place in the presence of sludge particles previously formed, resulting in a more settleable sludge. Accordingly, liquid is circulated over the whole of the bottom 25 of the clarification and sludge filtration zone, in radial or spiral flows as shown, then into the central distributing pit 26, through the distributing pipes 27, mixing and coagulating chambers 19, ports 28, and distributing duct 29 back into the lower part of the clarification zone 17. The power for such circulation is provided by the same air lift means 40 which is used to mix and coagulate the liquid in the chambers 19. For this purpose, each distributing pipe 27 communicates with the respective chamber 19 by outlet 44, located adjacent the center of the zone of suction established by the air lift as aforementioned, whereas the outlets 28 to the duct 29 are located in the mixing and coagulating chamber 19 adjacent the center of the zone of discharge pressure.

Figure 7:
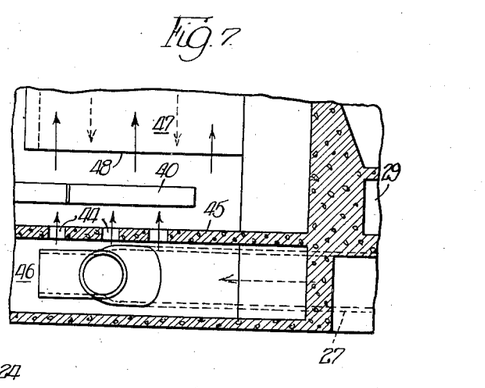
Figures 7, 8, and 9 are additional, partial, sectional views, taken respectively along the lines 7—7, 8—8, and 9—9 in Figure 2.

The outlets 44 to the mixing and coagulating chamber can be formed by branch conduits, as shown in Figure 6, or simply by perforations in a false bottom 45 of the mixing and coagulating chamber 19, with the distributing pipe 27 terminating in the chamber 46 below the false bottom, as shown in Figure 7. In either event, the outlets 44 are desirably distributed below and along the air lift tube 40, so as to uniformly distribute the liquid from the pipe 27 into the rising stream of liquid and air, produced by the air lift.

Figure 8:
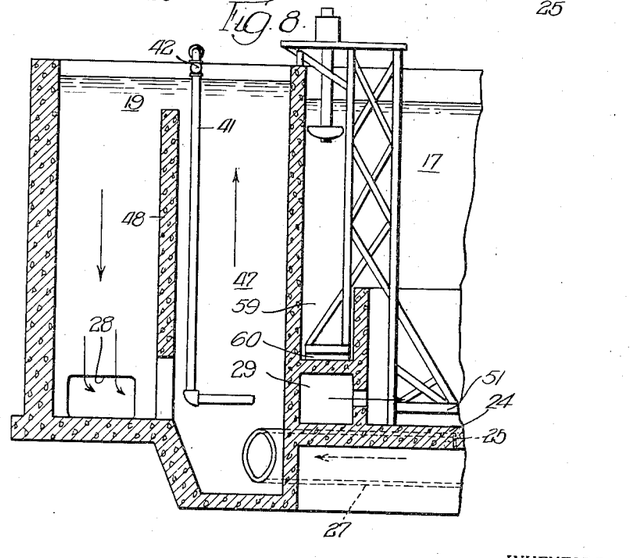

The rising zone 47, comprising the outlets 44, air lift 40, and rising column of liquid and air, is disposed along the walls 15 and 16, in the corner compartments shown in Figures 6 and 7, and centrally of the mixing and coagulating chambers 19, in the corner compartment shown in Figure 8. In each corner compartment the discharge openings 28 of the mixing and coagulating chambers are preferably arranged remotely from the openings 44, in the lower parts of the mixing and coagulating chambers. In order to enforce positive circulation of liquid through the entire depth of the mixing and coagulating chambers, we preferably install partition walls 48, extending vertically from above the bottom of the mixing and coagulating chambers to below the liquid level therein, and separating the rising zones 47 from the zones of downward return flow 49; the areas of the two zones being desirably such as to maintain substantially uniform velocity of the liquid in both of them.

It will be noted that in the present embodiment each distributing pipe 27 and set of openings 44 may be considered a suction zone associated with the air lift 40, whereas the passages 28 and duct 29 may be considered a pressure discharge zone associated with the same air lift.

Viewing the several parts from another standpoint, we may consider the central distributing sump 26, distributing pipes 27, mixing and coagulating chambers 19, ports 28, duct 29 and lower part of the zone 17 as part of a major mixing and coagulating zone, distinguished from the balance of the zone 17, which serves for sludge filtration and clarification. The lower part of the zone 17 serves both for coagulation and sludge filtration with clarification.

It is very important that proper liquid velocities be maintained in each of said zones, for best results of the treatment, and greatest effect of the power provided for the air lift 40. Efficiency of the physico-chemical treatment in the tank is generally more essential than mechanical efficiency of the air lift; and in case of conflict between mechanical and physico-chemical efficiencies, the latter must generally prevail. From the standpoint of purely mechanical efficiency the most desirable arrangement for the air lifts would be in the nature of ordinary pipes, of much smaller area than the chambers 48; however, such an arrangement, and various other expedients which would be mechanically efficient, are undesirable in view of physico-chemical requirements.

Chemicals are added to the liquid present in the tank by means of a pipe 50 entering the distributing sump 26. Each tank is provided with such a chemical inlet pipe 50, which receives a properly selected and proportioned dosage of chemicals from a chemical feeder and proportioner (not shown). These pipes 50 enter the tanks separately from the liquid inlet pipes 23, in order to make sure that reaction between the chemicals and the various substances in the raw liquid is started, as well as completed, in the presence of sludge from the sludge bed 43, whereby the fluocculent sludge particles initially formed, in the average, are more settleable and more resistant to agitation, than with any other type of chemical feed. These initial, flocculent particles are largely formed upon, or agglomerated with sludge particles previously formed.

The mixture of such particles with the carrier liquids flows through the aforementioned, major mixing and coagulating zone. Due to the recirculation mentioned, the liquid and solid particles, in the average, make more than one pass through this zone, and preferably the recirculation is such that the liquid and solid particles, in the average, make a plurality of integral passes, the exact number of passes depending on the type of treatment required, and also being a function of the velocities required in order to keep the sludge bed in suspension. During each recirculating pass, the liquid and solid particles are subjected to a variety of conditions, including different flow velocities, whereby the materials are mechanically mixed, and the physical process of floc formation and growth is promoted.

While the actual selection of such velocities, and arrangement of recirculating passes, depends on the type of treatment required, it might be said in general that certain maximum and minimum velocities must be kept in mind, in typical liquid treatments as herein contemplated. It is undesirable that the flow velocity in the mixing and coagulating zone should be much above 3 feet per second in most instances; or above 5 to 10 feet per second in some special instances; and this velocity generally should not fall much below 1 foot per second, in practically all instances. Velocities above these upper limits might be quite efficient mechanically, but would tend to disintegrate and destroy flocculent particles at an excessive and undesirable rate. Velocities below the stated lower limits would result in the sedimentation of sludge within the mixing and coagulating zone, at undesirable places, where deposits of sludge could not be removed. Accordingly, velocities such as about 1.5 foot per second, with considerable tolerances as stated, are generally maintained in these mixing and coagulating zones.

It should be understood that it is not possible, and not even desirable, to prevent disintegration of flocculent particles altogether. If such disintegration is not excessive it serves the desirable purpose of making the ultimate floc more uniform, dense, settleable, and resistant to breaking up tendencies during the subsequent treatment.

In accordance with these principles, we maintain flow velocities of about 1.5 foot per second in our mixing and coagulating zone, in typical liquid treatments, with tolerances as stated. Higher velocity may prevail locally; and in a process involving a number of integral recirculating passes, it is relatively unimportant at which point of the circulation such higher velocities are applied, so long as they are not applied at an excessive rate, or for an excessive time. In the present embodiment, the highest velocities are generally applied in the mixing and coagulating chamber 19, and particularly adjacent the air distributor 40, where considerable shearing movements between layers of liquid are unavoidable. Excessive shearing velocities are prevented by the aforementioned horizontal arrangement of the air diffuser tube 40 in a relatively large chamber 19; by selection of a proper material for such tubes 40, discharging relatively small air bubbles; and by the aforementioned arrangement of the distributing outlets 44 along the tubes 40. Proper velocities in all other parts and passages of the mixing and clarification zone are provided by properly dimensioning the same, with respect to the amounts of liquid to be carried.

When discharged from the openings 33 and circulating over the bottom 25 of the zone 17, the liquid flows at less than 1 ft. per second, in most instances. Relatively high velocities prevail adjacent these openings 33 and also adjacent the central distributing sump 26; and these local velocities may sometimes exceed 1 ft. per second. The average velocity of the liquid, over the bottom 25, is generally a few inches, or sometimes fractional inches, per second. Even lower velocities must be maintained in the upper parts of the clarification zone. Typical capacity velocities of liquid flow in this zone are, for instance, 3 inches per second over the bottom; 20 inches per minute in the body of the sludge bed 43; 4 inches per minute in the top of this sludge bed; and 3 inches per minute above the sludge bed.

A flow velocity of 3 inches per second, as mentioned, is conducive to suspension of relatively light particles, and sedimentation of relatively heavy particles of sludge, which is desirable according to principles known to the art.

The lower velocity of 20 inches per minute is obtained by virtue of the fact that in the body of the sludge bed, relatively little of the air-lift circulation is going on; the bulk of the circulating liquid being allowed to circulate from, through and into parts of the tank adjacent the bottom. Such a lower velocity is still conducive to suspension and sedimentation, however, with more emphasis on the latter. Light particles migrate upwardly into and partly through the sludge bed, while heavy particles migrate downwardly and settle on the bottom. As the light particles penetrate upwardly into the sludge bed, they agglomerate, and change into heavy particles, which tend to rise at a slower rate, and finally to subside and settle.

Accordingly, both light and heavy particles are present in practically all parts of the sludge bed. The upward flow of liquid through this mixture, towards the outlet launder, has a slight classifying tendency, as a result of which the descent of certain particles is somewhat retarded, and such particles are kept in suspension. Liquid interstices are present between the same, the average area of which tends to increase towards the top of the sludge bed. As a further result of such increasing areas, the average flow velocities show values decreasing towards the top, as mentioned, with final values such as 4 or 3 inches per minute.

These final capacity velocities are generally slow enough to prevent entrainment of sludge into the effluent launder, except for possible traces, as mentioned before. However, an open tank for the treatment of a certain liquid may require a limited final rising velocity of 3 inches per minute, or less, for a final turbidity of 5 parts per million or less, while a covered or closed tank may allow a greater final rising velocity, up to 4 inches per minute, or more, for equal results. Thus the covering or enclosing of a tank may increase the capacity of the tank by 33 percent, or more, as frequently found by persons skilled in this art.

In order to produce and maintain velocities as mentioned, a typical, open tank 12 may have the following approximate dimensions, for a throughput capacity of about 3.6 million gallons per day. Such a tank may be a square of 40 ft. side length, as measured on the interior of the walls 15 and 16. It may be about 18½ ft. deep, whereby it provides a detention period of about 90 minutes for said throughput capacity. When providing an average of at least 5 recirculating passes, we have a total capacity flow rate of 21.6 million gallons per day through the mixing and coagulating zone. In order to pass this flow at about 1.5 ft. per second velocity, four pipes 27 must have about 24 in. interior diameter. The distributing duct 29, adjacent the opening 28, may have a square cross section of about 21 in. side length, and may taper in inside width, to provide approximately uniform velocities, in spite of the branching off of flows through the openings 33. As mentioned before, the volume of the mixing and coagulating corners 19 amounts to about 20% of the total retention time of 90 minutes, that is, about 18 minutes; and the remainder of the tank, forming the clarification zone 17, provides approximately 72 minutes detention time. In terms of rising velocity, the throughput flow passes upwardly, above the sludge bed 43, at a speed of approximately 2 gallons per minute per square foot.

Such velocities, detention times, and circulation result in complete precipitation, and in an effluent which carries hardly any solid material. This result can be achieved with a minimum of chemical dosage. The actual amount of chemical dosage required, and of solids remaining in the effluent, depends on the types of salts and impurities contained in the liquid, on the grade and type of chemicals used, on the temperature of the liquid, and various other factors. With favorable conditions in these respects, the chemical dosage may be as low as indicated by the purely theoretical requirements for the reaction of the chemicals, or very little more, and the effluent will carry less than 5 parts per million of turbidity, or sometimes less than a noticeable trace. With less favorable conditions, the chemical charge may have to be increased or supplemented, or the effluent turbidity may rise to about 10 parts per million, or sometimes more.

Whatever actual treatment and results are required, the apparatus as described will obviously economize space to the utmost, and moreover, simplify the construction and operation of a battery of tanks 11, 12, etc. Furthermore, it will be simple to obtain even better results by covering or closing the battery of tanks, the rectangular design of which lends itself to the most economical types of building construction, with superstructures of framework, brick or other materials.

Figure 5:
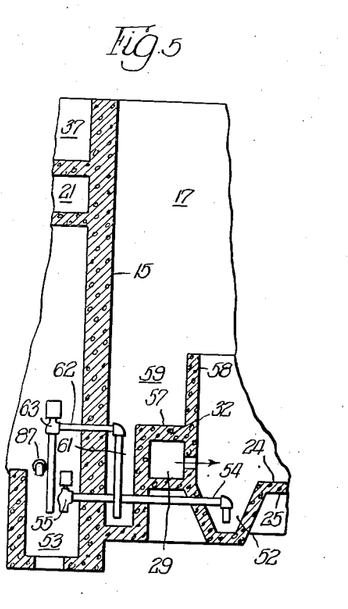

While some of the sludge particles are kept in suspension in the sludge bed 43 as aforementioned, most of the sludge ultimately settles on the surface 24 of the bottom 25, in manner known to the art, and is removed from said bottom by a sludge scraper assembly 51, which is known from other constructions, into a sludge sump 52, for ultimate disposal. In the present embodiment, the sludge sump is located adjacent the periphery of the clarification zone 17, and drained into an exterior sludge pit 53, as shown in Figure 5. For this purpose a relatively short pipe 54 extends into the bottom of the sludge sump 52 and discharges into the pit 53, having a valve 55 interposed thereon.

In some instances, all of the sludge may ultimately settle on the bottom, and be disposed through the bottom sump 52. In other instances, and in accordance with the present disclosure, an additional elevated settling area may be provided by the annular tray 57, formed by the top surface of the cover wall 32 above the annular duct 29. Sludge will tend to settle on this annular tray, as soon as the suspended sludge bed 43 has been built up to a sufficient elevation; and such settling tendency can be further promoted, and accumulation of settled sludge can be caused, by providing a cylindrical wall 58 upstanding from the inner edge of this tray, and enclosing an annular, elevated sludge concentrator 59, between this wall 58 and the peripheral wall of the tank. This sludge concentrator, and the inner wall 58 thereof, will preferably extend upwardly to a level in an intermediate part of the tank, between the top and bottom, to provide ample space for collection of sludge, and to prevent such collection if the sludge bed 43 drops below a certain level.

In order to remove accumulated sludge from the annular concentrator 59, we provide a scraper unit 60 in this concentrator, best shown in Fig.

8, and which can be driven together with the larger scraper assembly 51, and in effect form a part thereof. This scraper unit 60 may shift the sludge into a pocket 61, which is formed in one of the eight obtuse corners between diagonal and square walls of the clarification zone 17, in free communication with the outside of the sludge concentrator 59, and also extending on the outside of the distributing duct 29, downwardly, approximately to the same level to which the major sludge sump 52 extends. This auxiliary sump 61 may be drained by a pipe 62 discharging into the outer pit 53 and having a valve 63 interposed thereon.

In some instances, substantially all of the sludge may be removed through the elevated sludge concentrator 59 and valve 63; however, such operation involves very high velocities of circulation, substantially preventing sedimentation of sludge on the bottom 25, and as a result, a deeper tank is required, and uniform results are not always achieved. For these reasons we prefer to use both of the sludge outlet valves 55 and 63, in normal operation of our tank.

In the several corners of the octagonal clarification zone, other than the corner occupied by the sludge sump 61, we preferably provide sloping corner fills 65, above the tray 57, as shown in Figure 3. Thus we make the outside as well as the inside edge of the concentrator 59 circular and concentric with the tank. Such a concentrator having the shape of a plain, circular ring is easily cleaned out by a simple scraper 66, while a concentrator with octagonal or other cornered outside edge would require a complicated scraper arrangement. The corner fills 65 are very simple and inexpensive to provide, due to the obtuse shape of the corners between the diagonal walls 18 and the longitudinal and transverse walls 15 and 16; and these corner fills can be made steep enough to be self-cleaning, so that the full settling area of the octagon is utilized, without the use of complicated corner sweeps.

Figure 11:
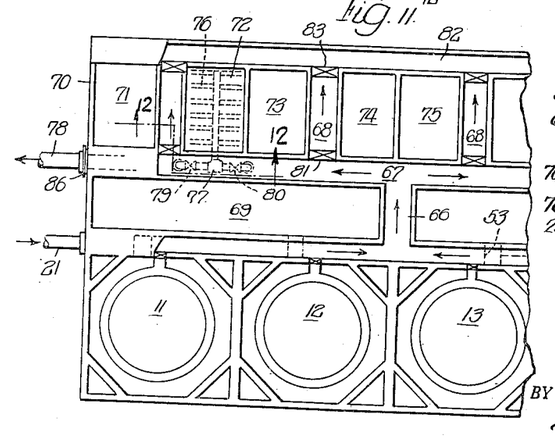
Figure 11 is a plan view, showing a more comprehensive combination of units, embodying this invention.
Figure 12:
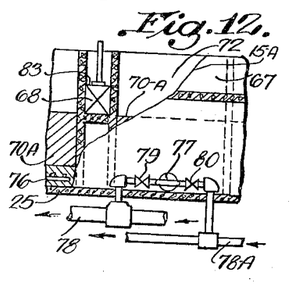
Figure 12 is an elevational view, partly in section, taken along lines 12—12 in Figure 11.

Referring now to Figures 11 and 12, it will be observed that the effluent header 37 of the tanks 11, 12, 13, 14, etc., by means of a transfer duct 66, communicates with the influent header 67 of a filter plant, which header 67 in turn, by means of branch channels 68, communicates with a plurality of sand filters; an operating gallery and pipe vault 69 being provided between the filters and the clarifying tanks, within the rectangular building 70 housing the complete plant. The individual filters are designated by the numerals 71, 72, 73, 74, 75, etc.; they are rectangular in plan view, and have filter beds 70—A, as usual. Each filter has an underdrain system 76, communicating with a fitting 77 in the pipe vault 69, whereby the underdrain may communicate with an effluent header 78 for clarified and filtered water, through a service outlet valve 79, and with a backwash header 78—A, through valve means 80. The branch channels 68 can be separated from the filter inlet header 67 by means of gates 81, and can be connected to an outlet header 82 for spent backwash water by means of other gates 83; these several gates being located at the ends of the branch channels 68. The complete arrangement of the filter plant is well known, and no claim is made for the same, as such.

In accordance with this invention, such a rectangular filter plant may be enclosed in the same building structure 70 with the rectangular clarifier plant previously described, with the operating and pipe gallery 69 disposed between the two plants and separated from the filter plant by a longitudinal wall 16—A. It has occurred to us that it is quite simple to provide a filter plant of approximately the same length as the clarifier plant; the usual rate of filtration being approximately the same as the rates of clarification, hereinabove discussed. The arrangement as shown and described is quite inexpensive, and at the same time is extremely convenient to operate.

Each filter can be operated individually, in well-known manner. Similarly, each clarifier can be operated individually, by means of the aforementioned, individual inlet valves 22, in conjunction with individual outlet gate means 84, which are preferably placed at the end of each outlet launder 38, as shown in Figures 2 and 4.

In case that a clarifier unit like 11, 12, etc., is automatically or manually removed from service, for a limited period, for instance, at times of low water demands, it is desirable to maintain the respective sludge bed 43 suspended and well conditioned. For this purpose, we prefer to keep the airlift circulation going and also to pass at least a small, continuous or intermittent flow of raw water and chemicals through the clarifier, even at times when the clarifier is temporarily out of service. Since at such times, the water cannot be removed from such a clarifier to the header 37, the respective gate means 84 being closed, we provide overflow means 87, adapted to pass water from slightly above the normal liquid level in each tank 11, etc. into the outside waste sumps 53, as shown in Figures 4 and 5.

The pipe gallery 69 may be subdivided by a plurality of superposed platforms, with interconnecting stairs (not shown) in manner well known from the usual filter plants.

The exact arrangement of channels and ducts can be modified; for instance, in some plants, the several channels are desirably secured to different walls, as illustrated; but this as well as other features is subject to change. The essential thing is that there is provided, by walls or partitions 15, 16, etc., in a lower part of the rectangular plant or building 70, and in general parallelism with a wall of the building, a rectangular series of square tanks 11, 12, etc., ducts 37, 21, etc., associated with the tanks, a row of filters 71, 72, etc., and ducts 78, etc., associated with the filters, with an operating gallery 69 for at least some of said ducts.

Figure 9:
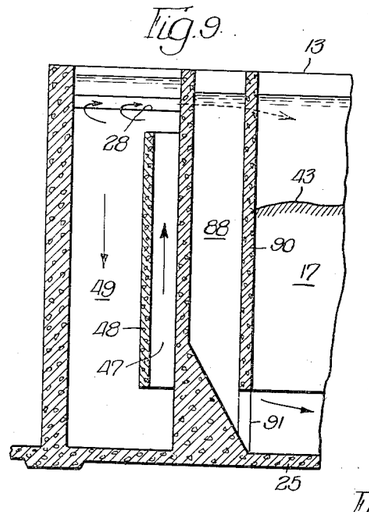

In some instances, the liquid requires mixing and coagulation for more than about 20% of the total detention time in the clarifier plant. In such cases the corners 19 of a square tank with an octagon inscribed are not quite sufficient to provide complete coagulation; at least so long as the octagon is a regular one. An additional, annular coagulating channel 88 may then be provided, for instance, in a peripheral part of the tank 13, as shown in Figures 2 and 9. In that event, the distributing duct 29 is omitted, and each mixing and coagulating compartment 19 communicates with this channel 88, rather than with a duct 29, through openings which are designated by the numeral 28, as in the other embodiment. In this case, the openings 28 are preferably located in upper parts of the mixing and coagulating chambers 19, so as to discharge into an upper part of the added coagulation channel 88; the discharge being preferably in a direction tangential to this channel. For this purpose, suitable guide baffles 89 may be associated with the elevated discharge openings 28. A coagulating channel 88 is separated from the clarification zone 17 by means of a cylindrical partition 90, resting on supports 91, and extending from the top of the tank to above the bottom 25, so that the liquid may enter the clarification zone 17 in substantially similar manner as heretofore described.

Figure 10:
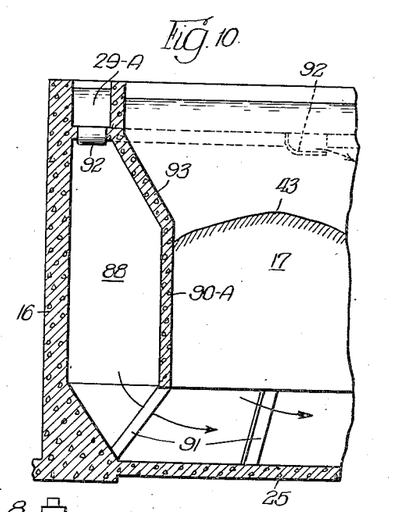
Figure 10 is a modification of the details shown in Figure 9.

In large tanks constructed according to Figure 9, difficulty may be encountered in maintaining a desirable spiral motion throughout the coagulation channel 88, when using only four corner inlets 28 for this channel. In order to minimize such difficulties, we sometimes use the construction shown in Figure 10. In this figure, an annular distributing duct 29—A is located adjacent the top of the tank, discharging into the top of a channel 88. The necessary communication between the mixing and coagulating corners and the duct 29—A is achieved in substantially the same manner as illustrated in Figure 8, except that the openings connecting such corners with the duct are located adjacent the top of the tank. Communication between the elevated duct 29—A and channel 88 may be achieved, for instance, by means of discharge nozzles 92 secured to the bottom of the duct 29—A and adapted to discharge horizontally, in a tangential direction with respect to the channel 88. In many instances it will be desirable to provide more rapid velocities in the duct 29—A than in the body of the channel 88; accordingly, the top section of this channel may flare downwardly; the partition 90—A having an upper portion 93 in the approximate shape of an inverted cone frustum, while the lower portion of the partition is cylindrical. The conical flare of the upper portion 93 of course, should generally be steep enough to prevent the deposition thereon of objectionable sediments in the clarification zone 17.

We claim:

1. A water treatment plant comprising a building structure with straight walls; straight, vertical partition means in a lower part of said building structure, separating a rectangular battery of tanks from a vault, said battery extending along a wall of said building structure; partition means located in said battery and dividing it into a plurality of square tanks; partial partition means in each of said tanks, partly separating mixing and clarification compartments therein; circulator means in said mixing compartments to maintain a circulation of water in said tanks; water and chemical inlet means for each of said tanks; water and sludge outlet means for each of said tanks; and valves interposed on such inlet and outlet means, said valves being located in said vault.

2. A water treatment plant according to claim 1, additionally comprising straight, vertical partition means located in a lower part of the building structure, separating the vault from a rectangular filter battery, and extending parallel with said battery of tanks; partition means located in said filter battery and dividing it into a plurality of rectangular filters; water inlet means for each of said filters, communicating with said water outlet means for said tanks; water outlet means for each of said filters; and valves interposed on such water inlet and outlet means for said filters, the last-mentioned valves being located in said vault.

3. A water treatment plant according to claim 2, wherein said water inlet and outlet means for said tanks and filters comprise ducts extending in said vault, parallel to said wall, and transverse branch connections to said tanks and filters respectively.

4. A water treatment plant according to claim 1, wherein the circulator means consists in air lifts located in said mixing compartments, and which additionally comprises air supply means leading to said air lifts and having extension along said ducts.

5. A water treatment apparatus comprising a square tank; partial partition means extending across the corners of said tank and separating four corner compartments from an inner clarification compartment in the tank, except for passages between such corner compartments and a lower, outer part of the clarification compartment; ducts communicating with a lower, inner part of the clarification compartment, extending below the bottom of the tank, and discharging into such corner compartments; circulator means in such corner compartments to maintain a circulation of water therein and through said passages, then through said lower parts of the clarification compartment, and back through said ducts to such corner compartments; inlet means to introduce water and chemicals into said circulation; and outlet means to withdraw water from the upper and sludge from the lower part of said clarification compartment.

6. A water treatment apparatus according to claim 5, wherein at least the lower part of the clarification compartment is circular and which additionally comprises sludge scraper means in such lower part, and means to rotate said sludge scraper means to scrape settled sludge from inner to outer parts of the clarification compartment.

7. A water treatment apparatus according to claim 6 wherein the outlet means to withdraw sludge is located in the outer part of the clarification compartment.

8. A water treatment apparatus according to claim 5 wherein the partial partition means are straight and at least part of the clarification compartment is octagonal.

9. A water treatment apparatus according to claim 5 additionally comprising a substantially annular duct installed on the inside of the corner compartments and around the clarification compartment, communicating with the former and discharging towards the latter at peripherally distributed positions, to provide part of said passages.

10. A water treatment apparatus according to claim 9 wherein said substantially annular duct is installed adjacent the bottom of the tank but communicates with the top of the corner compartments.

11. A water treatment apparatus according to claim 10, additionally comprising an annular wall upstanding from said substantially annular duct, and extending to below the top of the tank to define a sludge concentrator ring; sludge scraper means in said concentrator ring; means to propel said sludge scraper means along said concentrator ring; and sludge outlet means in the path of said sludge scraper means.

FRANK D. PRAGER.
ROY WELTER.

REFERENCES CITED

The following references are of record in the file of this patent:

UNITED STATES PATENTS

| Number | Name | Date |
|---|---|---|
| 373,257 | Waespi et al. | Nov. 15, 1887 |

(Other references on following page)

UNITED STATES PATENTS

| Number | Name | Date |
|---|---|---|
| 680,992 | Delattre | Aug. 20, 1901 |
| 732,208 | Mitchell | June 30, 1903 |
| 784,597 | Smith | Mar. 14, 1905 |
| 842,696 | Pfeiffer, Jr. | Jan. 29, 1907 |
| 1,030,366 | Winters | June 25, 1912 |
| 1,165,741 | Amos | Dec. 28, 1915 |
| 1,427,446 | Denoel | Aug. 29, 1922 |
| 2,110,721 | Fischer | Mar. 8, 1938 |
| 2,128,393 | Allen | Aug. 30, 1938 |
| 2,129,181 | Morse | Sept. 6, 1938 |
| 2,168,208 | Jenks | Aug. 1, 1939 |
| 2,196,908 | Bachmann | Apr. 9, 1940 |
| 2,223,257 | Mallory | Nov. 26, 1940 |
| 2,238,024 | Linch | Apr. 8, 1941 |
| 2,245,587 | Hughes | June 17, 1941 |
| 2,275,954 | Gibson | Mar. 10, 1942 |
| 2,320,512 | Daily | June 1, 1943 |
| 2,323,437 | Yeomans et al. | July 6, 1943 |
| 2,340,226 | Roberts et al. | Jan. 25, 1944 |
| 2,348,123 | Green et al. | May 2, 1944 |
| 2,353,358 | Prager | July 11, 1944 |
| 2,381,579 | Durdin, 3d | Aug. 7, 1945 |

FOREIGN PATENTS

| Number | Country | Date |
|---|---|---|
| 14,733 | Great Britain | 1915 |
| 122,428 | Great Britain | Jan. 24, 1919 |
| 258,102 | Great Britain | Sept. 16, 1926 |
| 333,973 | Great Britain | Aug. 28, 1930 |